(12) United States Patent
Smith et al.

(10) Patent No.: US 10,097,789 B2
(45) Date of Patent: Oct. 9, 2018

(54) MEDIA BUILD FOR MULTI-CHANNEL DISTRIBUTION

(71) Applicant: STARZ ENTERTAINMENT, LLC, Englewood, CO (US)

(72) Inventors: Stephen David Smith, Parker, CO (US); James Porter, Highlands Ranch, CO (US); Ray Milius, Littleton, CO (US)

(73) Assignee: Starz Entertainment, LLC, Englewood, CO (US)

( * ) Notice: Subject to any disclaimer, the term of this patent is extended or adjusted under 35 U.S.C. 154(b) by 405 days.

(21) Appl. No.: 13/758,389

(22) Filed: Feb. 4, 2013

(65) Prior Publication Data

US 2013/0208182 A1    Aug. 15, 2013

Related U.S. Application Data

(62) Division of application No. 11/924,270, filed on Oct. 25, 2007, now Pat. No. 8,375,416.

(51) Int. Cl.
| | |
|---|---|
| H04N 7/00 | (2011.01) |
| H04N 7/01 | (2006.01) |
| H04N 5/782 | (2006.01) |
| H04N 9/82 | (2006.01) |
| H04N 9/804 | (2006.01) |

(52) U.S. Cl.
CPC ............... *H04N 7/01* (2013.01); *H04N 5/782* (2013.01); *H04N 9/8211* (2013.01); *H04N 9/8244* (2013.01); *H04N 9/8042* (2013.01)

(58) Field of Classification Search
CPC ........ H04N 9/8042; H04N 7/01; H04N 5/782; H04N 9/8211
USPC ............ 386/239, 248, 332, 232; 379/110.01; 381/57, 104, 107, 110; 725/90
See application file for complete search history.

(56) References Cited

U.S. PATENT DOCUMENTS

| | | | |
|---|---|---|---|
| 5,430,495 A | | 7/1995 | Ko |
| 5,583,561 A | * | 12/1996 | Baker et al. .................... 725/93 |
| 5,666,426 A | * | 9/1997 | Helms ............................. 381/57 |
| 5,822,018 A | | 10/1998 | Farmer |

(Continued)

FOREIGN PATENT DOCUMENTS

| | | |
|---|---|---|
| JP | 04073696 | 3/1992 |
| WO | 2006/087974 | 8/2006 |

*Primary Examiner* — Mishawn Hunter
(74) *Attorney, Agent, or Firm* — Kilpatrick Townsend & Stockton LLP (57) ABSTRACT

According to one embodiment, methods and systems are disclosed for converting multi-media content to multiple deliverable formats using a conversion workflow. For example, a single source content file can be captured and a plurality of deliverable content files can be derived from the single source content file. Each of the plurality of deliverable content files can be in a format specific to a different distribution channel. That is, a single source media file can be used to automatically build one or more distribution files for a particular channel or channels. Furthermore, the distribution files can be built including logos, branding, open/close graphics, ratings, promo material, etc. The inclusion of these elements can be based on a common set of business rules defining, for example, what elements should be included in different types of distribution files.

20 Claims, 6 Drawing Sheets

(56) References Cited

U.S. PATENT DOCUMENTS

| | | | |
|---|---|---|---|
| 5,987,106 A * | 11/1999 | Kitamura | 379/110.01 |
| 6,055,543 A * | 4/2000 | Christensen | G06F 17/30067 |
| 6,363,380 B1 | 3/2002 | Dimitrova | |
| 6,584,201 B1 * | 6/2003 | Konstantinou et al. | 381/57 |
| 6,745,161 B1 | 6/2004 | Arnold et al. | |
| 6,910,003 B1 | 6/2005 | Arnold et al. | |
| 7,139,031 B1 | 11/2006 | Bray | |
| 7,904,813 B1 | 3/2011 | Takahaski et al. | |
| 8,375,416 B2 | 2/2013 | Smith et al. | |
| 2002/0013698 A1 | 1/2002 | Vaudrey et al. | |
| 2002/0131607 A1 * | 9/2002 | Belenger et al. | 381/110 |
| 2002/0154246 A1 | 10/2002 | Hawkins | |
| 2003/0005455 A1 * | 1/2003 | Bowers | 725/90 |
| 2003/0140034 A1 * | 7/2003 | Probst | G06F 17/30038 |
| 2003/0194210 A1 | 10/2003 | Shiiyama | |
| 2004/0018778 A1 * | 1/2004 | Easterbrook | H04N 5/44 439/701 |
| 2004/0062517 A1 * | 4/2004 | Sakai | H04N 9/7921 386/232 |
| 2004/0093220 A1 | 5/2004 | Kirby et al. | |
| 2004/0218898 A1 * | 11/2004 | Cheng | H04N 5/765 386/232 |
| 2004/0252979 A1 | 12/2004 | Momosaki et al. | |
| 2005/0010409 A1 | 1/2005 | Hull et al. | |
| 2005/0071155 A1 | 3/2005 | Etter | |
| 2005/0144645 A1 * | 6/2005 | Casey et al. | 725/95 |
| 2006/0210242 A1 * | 9/2006 | Noda | 386/83 |
| 2007/0011012 A1 | 1/2007 | Yurick et al. | |
| 2007/0024705 A1 * | 2/2007 | Richter et al. | 348/142 |
| 2007/0086604 A1 * | 4/2007 | Guillorit | 381/107 |
| 2007/0245019 A1 * | 10/2007 | Westberg | H04L 12/2801 709/225 |
| 2008/0065691 A1 * | 3/2008 | Suitts | H04N 21/23439 |
| 2008/0092168 A1 | 4/2008 | Logan et al. | |
| 2008/0201751 A1 * | 8/2008 | Ahmed | H04N 21/4312 725/109 |
| 2010/0289948 A1 | 11/2010 | Molaro et al. | |

* cited by examiner

MEDIA BUILD FOR MULTI-CHANNEL DISTRIBUTION

CROSS-REFERENCES TO RELATED APPLICATIONS

This application is a Divisional of U.S. application Ser. No. 11/924,270, filed Oct. 27, 2007, entitled MEDIA BUILD FOR MULTI-CHANNEL DISTRIBUTION, which claims the benefit of U.S. Provisional Application No. 60/863,307, filed Oct. 27, 2006, entitled AUDIO LEVEL NORMALIZATION, and U.S. Provisional Application No. 60/863,312 filed Oct. 27, 2006, entitled MEDIA BUILD FOR MULTI-CHANNEL DISTRIBUTION, of which the complete disclosures of both are incorporated herein by reference in their entirety for all purposes.

BACKGROUND OF THE INVENTION

Embodiments of the present invention relate generally to distribution of content and more particularly to generation and distribution of multi-media content over a variety of channels.

Content providers typically manage and distribute a number of content assets such as multi-media programs, e.g., movies, television programs, etc. The content provider may make these assets available via any one or more of a variety of different channels such as the Internet, satellite or terrestrial broadcast, cable transmission, etc. to a number of subscribers or users. However, each distribution channel may have different format, protocol, or other requirements that may or may not be directly compatible with the source of the content asset. To prepare content for distribution via these different channels is typically a highly labor intensive process in which content components are manually collected and assembled into a finished content file for distribution. For example, in order for a content provider to generate a deliverable content file, a human operator must collect various components such as a video track, one or more audio tracks, close captioning information, and various other components appropriate for the deliverable file and the channel for which it is distributed. Such a process is expensive, time consuming, and subject to human error.

Multi-media content distributed by a content provider can include audio portions with audio tracks that vary from quiet to loud throughout the length of the content. For example, an action movie can include very loud portions involving fights, explosions, car chases, etc. as well as quieter portions. However, extremes in audio volume can be annoying or undesirable to users or consumers of the content. One approach to reducing these extremes in volume is to implement an automatic volume control on the end device playing the content. In such implementations, the end device, such as a television, can automatically adjust the volume of the audio to reduce or control extreme changes in the audio level. However, not all devices are so equipped. Thus, another approach has been for the content provider to attempt to normalize the audio level of a deliverable content file. This process involves sampling the audio level of the content file at fixed times throughout the audio track and normalizing the audio level of the entire audio track based on the collection of samples. However, results of such a process can be easily skewed by audio tracks having a significant portion thereof containing very loud audio, e.g., action movies, or having a significant portion thereof containing very quiet audio, e.g., drama movies.

Hence, there is a need in the art for improved methods and systems for generating and distributing multi-media content over a variety of channels. There is also a need in the art for improved methods and systems for normalizing an audio level of the multi-media content.

BRIEF SUMMARY OF THE INVENTION

Embodiments of the invention provide systems and methods for generation and distribution of multi-media content over a variety of channels. According to one embodiment, a method of converting multi-media content to multiple deliverable formats using a conversion workflow can comprise capturing a single source content file. Capturing the single source content file can further comprise identifying one or more sub-assets within the single source content file based on the conversion workflow, extracting the one or more sub-assets, and saving the one or more sub-assets as individual constituent parts of the single source content file.

A plurality of deliverable content files can be derived from the single source content file based on the conversion workflow. Each of the plurality of deliverable content files can be in a format specific to a different distribution channel. Deriving the plurality of deliverable content files from the single source content file comprises deriving the plurality of deliverable content files from the individual constituent parts of the single source content file. According to one embodiment, deriving the plurality of deliverable content files can be based at least in part on a set of business rules defined by the conversion workflow. Deriving the plurality of deliverable content files can comprise trans-coding content from the source content file to the format specific the different distribution channels. Additionally or alternatively, deriving the plurality of deliverable content files can comprise adding one or more graphics to the deliverable content files based on the business rules, adding branding information to the deliverable content files based on the business rules, adding rating information to the deliverable content files based on the business rules, adding content elements to the deliverable content files based on the business rules, etc. The content elements include but are not limited to closed captioning information, one or more alternative language soundtracks, digital rights management information, etc.

Various other embodiments of the present invention provide methods and systems for normalizing an audio portion of multi-media content. According to one embodiment, a method of normalizing an audio level of multi-media content can comprise locating spoken dialog within the multi-media content based on closed captioning data related to the multi-media content. For example, locating the spoken dialog within the multi-media content is further based on matching a timestamp on the closed captioning data to a timestamp on the multi-media content. An actual sound level of an audio portion of the multi-media content can be detected based on the located spoken dialog.

In some cases, the method can further comprise determining whether an indication of an audio level associated with the multi-media content matches the actual sound level of the audio portion of the multi-media content. For example, the indication of the audio level associated with the multi-media content can comprise metadata within or associated with the multi-media content. In response to determining that the indication of the audio level associated with the multi-media content does not match the actual sound level of the audio portion of the multi-media content, the actual sound level of the audio portion of the multi-media content can be adjusted and/or the indication of the audio level associated with the multi-media can be adjusted. In some cases, in response to determining that the indication of the audio level associated with the multi-media content does not match the actual sound level of the audio portion of the multi-media content, a determination can be made as to whether to adjust the actual sound level of the audio portion of the multi-media content or the indication of the audio level associated with the multi-media. Such a determination can be based at least in part on a set of business rules.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

According to one embodiment, a method is disclosed for converting multi-media content to multiple deliverable formats using a conversion workflow. The method can include capturing a single source content file and deriving a plurality of deliverable content files from the single source content file. Each of the plurality of deliverable content files can be in a format specific to a different distribution channel.

Generally speaking, embodiments of the present invention can include automated batch processing of a single file to produce multiple versions with various encoding and/or branding with little user interaction. That is, a single source media file can be used to automatically build one or more distribution files for a particular channel or channels. Furthermore, the distribution files can be built including logos, branding, open/close graphics, ratings, promo material, etc. The inclusion of these elements can be based on a common set of business rules defining, for example, what elements should be included in different types of distribution files.

According to another embodiment, a method is disclosed for normalizing an audio level of multi-media content. The method can include locating spoken dialog within the multi-media content based on closed captioning data related to the multi-media content. An actual sound level of an audio portion of the multi-media content can be determined based on the located spoken dialog. If the actual sound level of the spoken dialog does not match an indication of an audio level associated with the multi-media content, the actual sound level of the audio portion of the multi-media content and/or the indication of the audio level associated with the multi-media content can be adjusted.

Generally speaking, under embodiments of the present invention, an algorithm can be applied to normalize sound for a given video program or other multi-media content. According to one embodiment, normalization can be achieved by looking for spoken dialog using closed captioning information associated with the content. By identifying the scenes with dialog in the program, some or all of the identified scenes can be used to set the audio level based on the spoken dialog. According to one embodiment, the loudest and softest samples can be screened to prevent the results from being skewed due to overly loud or overly quiet samples.

Figure 1:
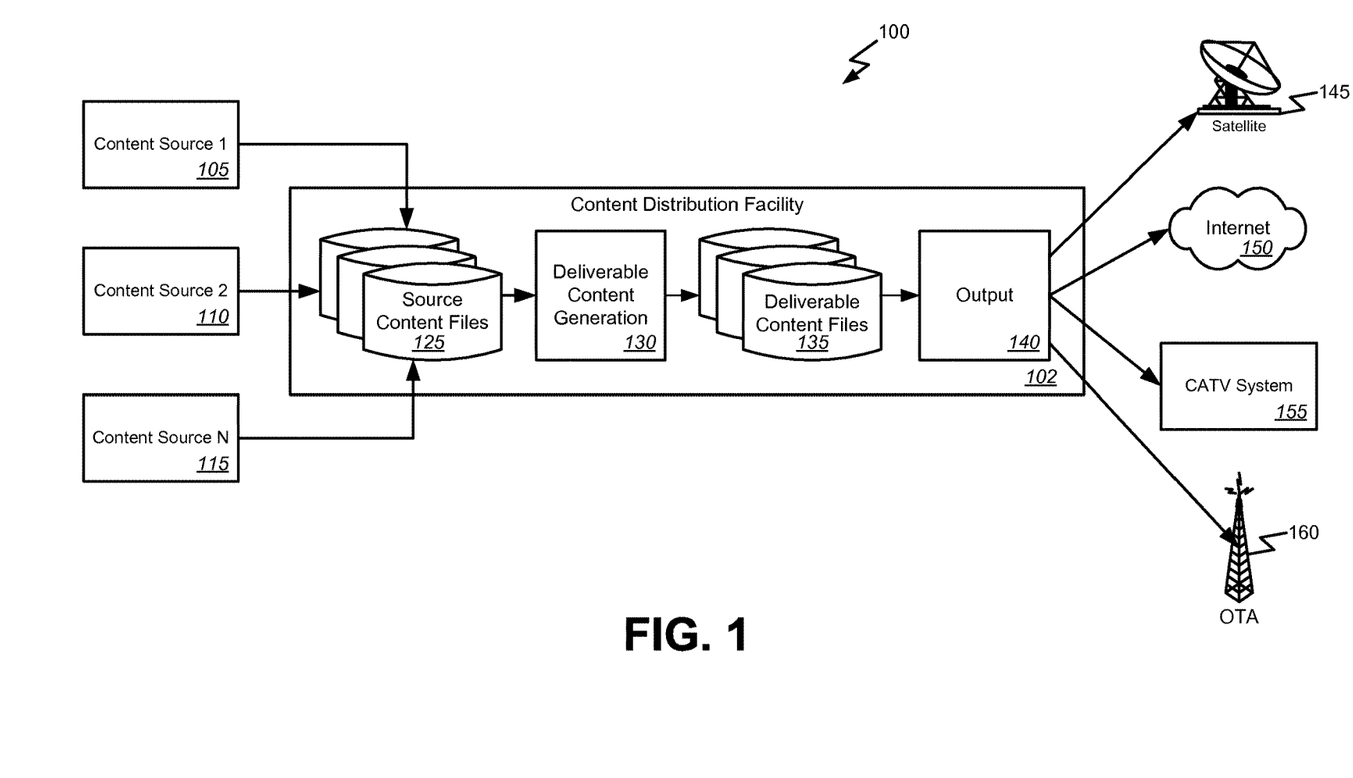
FIG. 1 is a block diagram illustrating components of an exemplary content distribution system in which various embodiments of the present invention may be implemented.

FIG. 1 is a block diagram illustrating components of an exemplary content distribution system in which various embodiments of the present invention may be implemented. In this example, the system 100 includes a number of content sources 105-115 that can supply multi-media content to content distribution facility 102. For example, the content sources 105-115 can provide movies, television programs, audio programs, etc. to the content distribution facility. This content can be communicated to the content distribution facility by any of a number of communication media including but not limited to satellite transmissions, the Internet or other communications network, over-the-air transmission, etc.

Generally speaking, the content distribution facility 102 can store the multi-media content provided by the content sources 105-115 and redistribute the content to a number of subscribers or users via any of a variety of channels including but not limited to satellite 145 transmissions, the Internet 150 or other communication network, a cable television system 155, over-the-air 160 transmissions, etc. As will be seen, the content distribution facility 102 can be adapted to convert multi-media content to multiple deliverable formats for delivery to the subscribers or users via the various channels 145-160.

More specifically, the content distribution facility 102 can include a source content file repository 125 in which source content files provided by the content sources 105-115 can be stored. A deliverable content generation module 130 can be adapted to read the source content files and generate a number of different deliverable content files to be stored in a deliverable content file repository 135. That is, the deliverable content generation module 130 can be adapted to convert multi-media content from the source content file repository to multiple deliverable formats specific to the different distribution channels 145-160.

Generally speaking, the deliverable content generation module 130 can include an automated batch process, i.e., a conversion workflow, to produce multiple versions of a source content file with various encoding and/or branding with little user interaction. That is, a single source media file can be used to automatically build one or more distribution files for a particular channel or channels 145-160. The distribution files can then be read from the deliverable content file repository 135 by the output module 140 for transmission via the targeted distribution channel. For example, the output module 140 can be instructed or triggered by the deliverable content generation module 130 or by another module to transmit the deliverable content file at a scheduled time, upon demand by a user, or upon occurrence other events or conditions.

Figure 2:
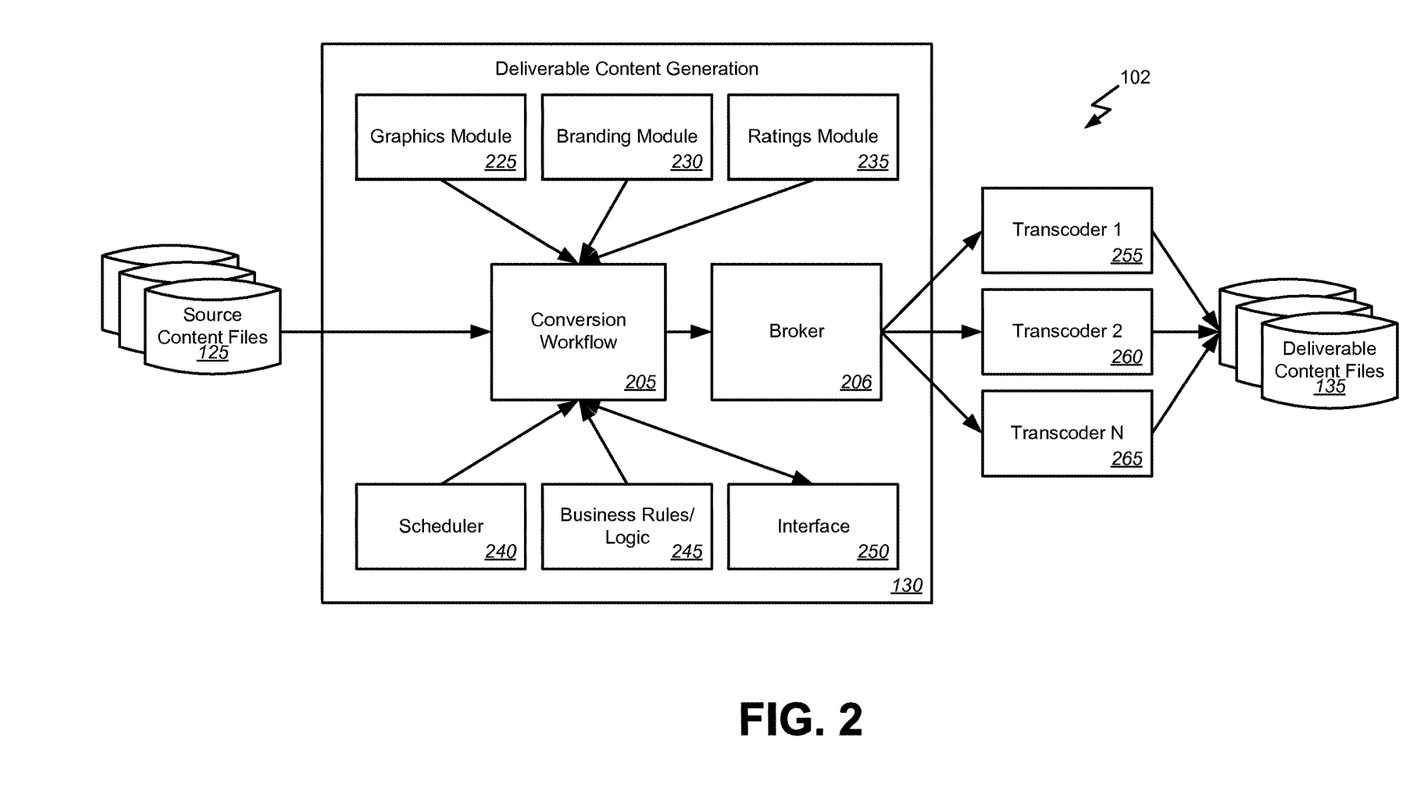
FIG. 2 is a block diagram illustrating a system for providing media for multi-channel distribution according to one embodiment of the present invention.

FIG. 2 is a block diagram illustrating a system for providing media for multi-channel distribution according to one embodiment of the present invention. More specifically this example illustrates additional details of the content distribution facility 102 described above. In this example, the system 102 includes a source content file repository 125, a common conversions workflow 205, a broker 206, a deliverable content files repository 135, and a number of trans-coders 255-265. The content repository 125, common conversions workflow 205, broker 206, deliverable content files repository 135, and trans-coders 255-265 can be communicatively coupled with one another via a network of any type commonly used to support electronic communications.

According to one embodiment, the repository of source content files 125 can store files representing one of more assets, i.e., multi-media content provided by the content sources 105-115. Each asset can comprise one or more sub-assets. For example, a multi-media program, i.e., asset, can have video, multiple audio, close captioning, and other sub-assets. During an intake or ingest process, the system 102 can receive a particular asset and process the asset to identify each sub-asset. The sub-assets can be identified, for example, based on industry standards for formats of the source content and/or each sub-asset. Once identified, the sub assets can be extracted from the source and stored in the repository of source content files 125. The sub-assets can be any of a variety of formats depending upon the type of sub-asset. For example, a sub-asset representing a video portion of a multi-media content asset can be a Windows Media file, an Audio Video Interleave (AVI) file, a Motion Pictures Expert Group (MPEG) file, or other format suitable for representing video. Similarly, a sub-asset representing a graphic for use in or with a multi-media content asset can be a Graphics Interchange Format (GIF) file, a Joint Photographic Experts Group (JPEG) file, bitmap file or another format suitable for representing a graphic. According to one embodiment, the sub-assets may also be marked with metadata or other indications identifying the sub-asset for future use. As will be seen, one or more of these sub-assets and the metadata related thereto can then be used to produce deliverable content files in a manner that is independent of the format in which the sub-assets are available.

Generally speaking, the conversion workflow 205 can receive a request for generation of a deliverable multi-media asset, for example from scheduler 240 which will be described in detail below. In response to the request, the conversion workflow 205 can read or retrieve one or more sub-assets of a source content file from the repository of source content files in the source content file repository 125, select one or more trans-coders 255-265 for conversion of the selected sub-assets of the source content file to a format suitable for transmission via a particular channel, and provide the selected sub-assets or an indication thereof to the broker 206. The broker can select an appropriate one or more trans-coders 255-265 for conversion of the identified sub-assets to a desired format. The transcoders can in turn save the resulting deliverable content files in a repository of deliverable content files 135. That is, one or more transcoders 255-265 can be selected or loaded by the conversion workflow via the broker 206 to convert the source content file to a number of different formats such as Real Media, Windows Media, MPEG, etc. depending upon the network and/or channel it is intended to be transmitted over or the end equipment it is intended to be consumed by. Thus, the conversion workflow 205 is dynamic in the sense that it selects or utilizes one or more trans-coders 255-265 based on the sub-assets of the source content file, the network and/or channel the deliverable content file will be transmitted over, the end equipment to which the deliverable content file will be sent, and/or other factors as will be discussed below.

The system 102 can also include a scheduler 240, and set of business rules or logic 245, and an interface 250. The scheduler 240 can be adapted to provide content programming information, e.g., a transmission schedule, to the conversion workflow 205. The interface 250 can adapted to allow a human operator to interface with and/or control the conversion workflow 205 and possibly other elements of the system 102. According to one embodiment, the interface may also provide a scratchpad or other working area to play-out or render a deliverable content file to allow previewing and/or editing of the deliverable content file by the human operator. The set of business rules or logic 245 can be adapted to provide a set of rules to be applied to the source content files by the conversion workflow 205 in the conversion process. These rules can be applied to all files or only specified files based on any of a number of criteria including but not limited to the source content file format, the deliverable content file format, the type of content, etc.

More specifically, the business rules 245 can define sub-assets of the source content files 125 to be used for a particular deliverable. Additionally or alternatively, the business rules 245 can define one or more trans-coders 255-265 to be used for specific sub-assets and/or specific delivery channels and/or end equipment. These rules can be defined based on any of a number of criteria that can include, but is not limited to, industry specifications for various format types, business agreements with one or more content providers, service agreements with subscribers or users, agreements with one or more advertisers, governmental controls or regulations, etc.

The system can also include a graphics module 225, a branding module 230, and a ratings module 235. These modules can provide additional information and/or content elements to be selectively included in the deliverable content file based on the business rules 245. That is, based on the business logic 245, the conversion workflow can cause additional elements including but not limited to open and close graphics, logos or other branding information, ratings information such as V-chip rating information and/or MPAA rating information, and/or other content elements to be included in one or more of the deliverable content files.

In use, the system 102, via the elements illustrated in FIG. 2, can implement a method for automated batch processing of a single source content file to produce multiple versions with various encoding and/or branding with little user interaction. Furthermore, this conversion can be performed in a manner that is flexible or agnostic as to the types of sub-assets represented by the source content file and the deliverables to be generated. That is, the conversion workflow can be adapted to identify the types of sub-assets available in the source content file repository 125 and, based on the available sub-assets, the deliverable(s) requested, and/or the business rules 245, determine which assets to use to generate the deliverable content and how to combine and trans-code those sub-assets to generate the deliverable content.

Capturing a single source content file can further include identifying one or more sub-assets in a source, extracting the one or more sub-assets, and saving the sub-assets. As noted above, identifying the one or more sub-assets can be based on industry standards for the format, marking, location, and/or other characteristics of the sub-assets in or related to the source. Furthermore, identifying the sub-assets can be based in part on the set of business rules 245. For example, the business rules 245 may specify that, for a particular source or type of source content file, one or more particular sub-assets should be present. Once the sub-assets have been identified and extracted, a set of metadata or other indications can be generated to mark or otherwise identify the sub-asset(s). These metadata or other indications can also be saved with the sub-assets for use in searching, identifying, etc. each sub-asset when generating deliverable content files.

Generally speaking, the conversion workflow 205 can receive a request, i.e., a work order, from the scheduler 240.

The request can identify a type of multi-media deliverable file to be generated. For example, the multi-media deliverable file may be a high-definition version of a particular movie. Also identified may be other schedule specific elements to be included such as graphics or branding information. For example, during a holiday period a specific graphic may be scheduled for use on or in the multi-media deliverable content files. The conversion workflow 205 can identify the types of sub-assets available in the source content file repository 125. The conversion workflow 205 can also read a set of rules from the business logic 245 defining sub-assets of the source content files 125, branding information, ratings information, graphics, or other elements to be used for a particular deliverable as well as the manner in which the sub-assets are to be trans-coded. Based on the sub-assets available and the business rules 245, the conversion workflow 205 can determine how to derive the deliverable content files requested.

Deriving the plurality of deliverable content files can comprise trans-coding content from the source content file to the format specific the different distribution channels. As noted, deriving the plurality of deliverable content files can be based at least in part on a set of business rules. For example, deriving the plurality of deliverable content files can comprise adding one or more graphics to the deliverable content files based on the business rules. Additionally or alternatively, deriving the plurality of deliverable content files can comprise adding branding information to the deliverable content files based on the business rules. In yet another example, deriving the plurality of deliverable content files can comprise adding rating information to the deliverable content files based on the business rules.

Inclusion of other types of content elements is also contemplated and considered to be within the scope of the present invention. That is, deriving the plurality of deliverable content files can comprise adding content elements to the deliverable content files based on the business rules. For example, the content elements include but are not limited to closed captioning information, alternative language soundtracks, digital rights management information, etc.

As noted above, once the constituent sub-assets to be used to generate a deliverable content file have been identified by the conversion workflow 205, the sub-assets or an indication thereof can be passed to the broker 206 along with an indication of or direction for performing trans-coding of the sub-assets into the deliverable file. That is, the conversion workflow 205 can identify to the broker 206 which output formats are to be generated. The broker 206 can in turn select the appropriate trans-coder 255-265 based on technical considerations, i.e., which trans-coder is capable of performing what kind of conversions, as well as other considerations such as which trans-coders have an active license for performing the requested conversion processes, the cost of the license or the conversion, or other considerations. Such technical or other considerations can be based on a set of predefined information stored in or by the broker 206, the business rules 245, or elsewhere in the system 102.

Once the sub-assets have been identified and combined by the conversion workflow 205 and trans-coded by the broker 206 and an appropriate trans-coder 255-265, the resulting deliverable content file can be stored in the deliverable content file repository 135 to be played out as appropriate. That is, as noted above, the deliverable content files can be read from the deliverable content file repository 135 for transmission via a targeted distribution channel. For example, the output module can be instructed or triggered to transmit the deliverable content file at a scheduled time, upon demand by a user, or upon occurrence other events or conditions.

Figure 3:
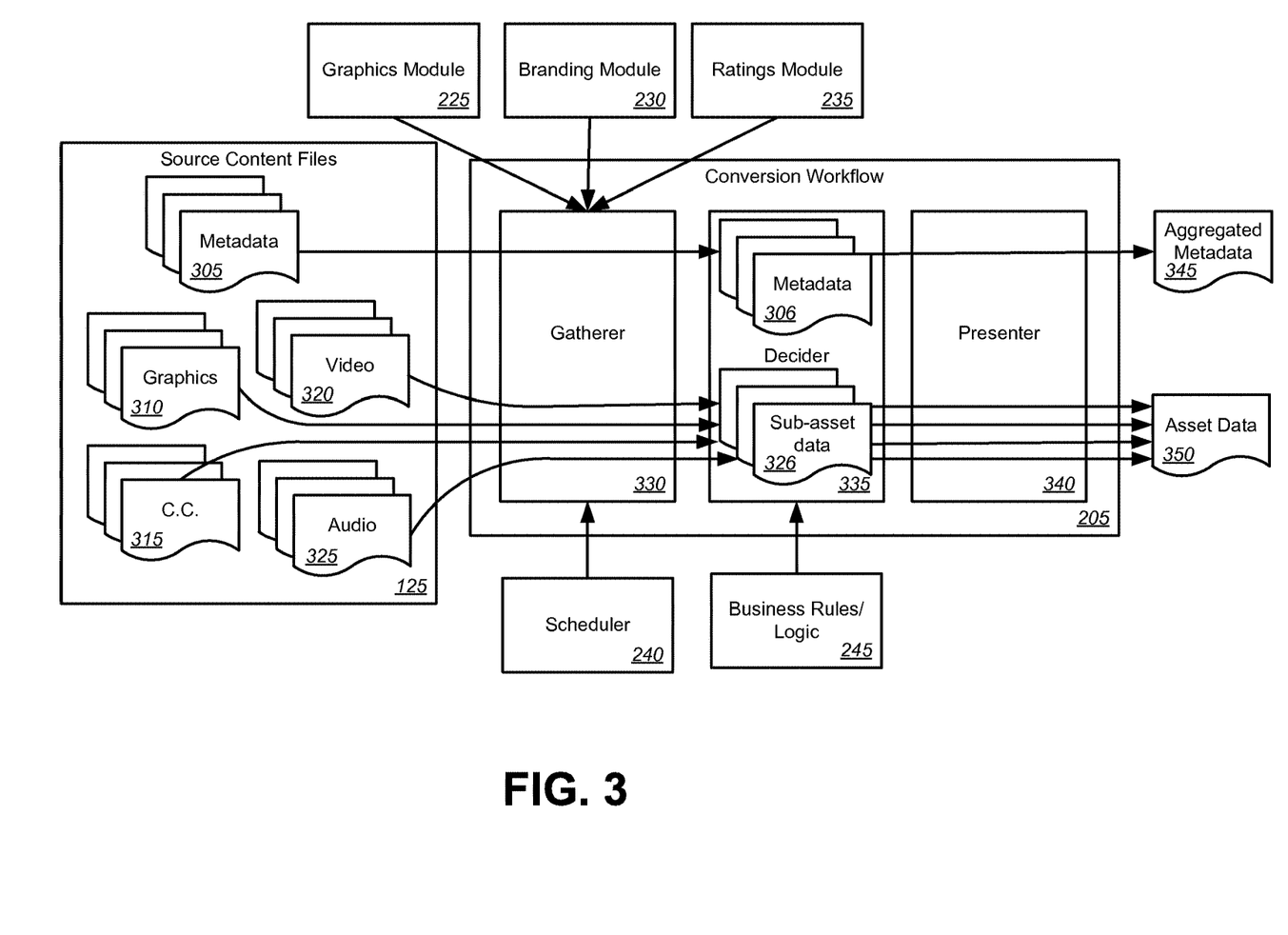
FIG. 3 is a block diagram illustrating additional details of a conversion workflow according to one embodiment of the present invention.

FIG. 3 is a block diagram illustrating additional details of a conversion workflow according to one embodiment of the present invention. More specifically, this example illustrates additional details of the source content files repository 125 and the conversion workflow 205 described above. As illustrated here, the source content files repository 125 can include a number of metadata files 305 and a number of sub-asset data files 310-325 as described above. As noted, the sub-asset data files 310-325 can include, for example, graphics 310, closed captioning information 315, video files 320, audio files 325, and/or any other multi-media content sub-asset. Also as noted above, these files can be stored in any number of a variety of file formats appropriate for storing that particular kind of sub-asset. For example, graphics files 310 can include JPEG, GIF, bitmap, or another type of graphics file format. Similarly, video files 320 can include MPEG, AVI, Windows Media, or any other type of video file format.

Metadata files 305 stored in the source content file repository 125 can relate to and/or identify the sub-asset data files 310-325. For example, a metadata file can comprise an eXtensible Markup Language (XML) or another format file that identifies one or more of the sub-asset data files 310-325, e.g., by name, storage location, etc., and can identify the file type, format, content, etc. As will be seen, these metadata files 305 can be used to identify and aggregate the sub-asset data files 310-325 to form a set of asset data 350 that can in turn be used to derive or generate the deliverable content file(s).

The conversion workflow 205 can further include a gather module 330, a decider module 335, and a present module 340. The gatherer module 330 can be adapted to receive a request, i.e., a work order, from the scheduler 240. The request can identify a type of multi-media deliverable file to be generated. For example, the multi-media deliverable file may be a high-definition version of a particular movie. Upon receiving the request, the gatherer module 330 can identify the types of sub-asset files 310-325 available in the source content file repository 125 based on the metadata 305 related to those files 310-325. The identification of appropriate sub-asset files 310-325 can also be based on the type of deliverable requested. For example, the scheduler can indicate a particular version of a multi-media asset to include particular elements or sub-assets such as a specific language soundtrack, a specific video format, e.g., widescreen, full screen, etc., or other specifics for the deliverable.

The gatherer module 330 can also receive information from the graphics module 225, branding module 230, and ratings module 235 as discussed above. That is, based on information from the scheduler 240 and/or the graphics module 225, branding module 230, and ratings module 235, the gatherer module 330 may identify elements to be included such as graphics or branding information. For example, during a holiday period a specific graphic may be scheduled for use on or in the multi-media deliverable content files. The gatherer module 330 can then identify an indicated graphic file 310 in the source content files repository 125 based on the information from the scheduler 240, graphics module 225 and the metadata files 305.

Furthermore, if the specified graphic or any other requested sub-asset is not available in the source content file repository 125, the gather can issue a request for the sub-asset(s). For example, the gatherer module 330 can issue a request to a human operator to provide the requested sub-asset. In some cases, further processing by the conversion workflow may pause or wait until the requested sub-assets are available.

Once the requested sub-assets are identified by the gatherer module, the metadata 305 related to those sub-asset files, i.e., the asset data, can be passed to the decider module 335. The decider module 335 can also read a set of rules from the business logic 245 relating to sub-assets of the source content files 125, branding information, ratings information, graphics, or other elements to be used for a particular deliverable as well as the manner in which the sub-assets are to be combined and/or trans-coded to form a particular deliverable content file. Based on the sub-assets available and the business rules 245, the decider module 335 can determine how to derive the deliverable content files requested. For example, a rule may define that for a particular type of deliverable, a specific type of audio file should be used. In another example, a rule may define what, if any, branding information or graphics should be included with a specific type of deliverable content.

According to one embodiment, the decider module 335 may also determine, for example based on one or more of the business rules 245 and/or other logic, acceptable substitutions that may be made between sub-assets. For example, if a particular video format is specified, e.g., a widescreen format in AVI file format, but a sub-asset file of that type is not available in the source content file repository, the decider module 335 can determine if another file type identified by the gatherer module 330 can be used as a substitute, i.e., may be converted and/or used instead of the specified file type. So, for example, if the requested widescreen format in an AVI file format is not available but the gatherer module 330 identifies a wide screen video format in a Windows Media file format in the source content file repository 125, the decider module 335 can determine whether the Windows Media file can be used to generate the deliverable content file. The decider module 335, upon determining to make such a substitution, can also update the metadata 306 related to the sub-asset data files 326 so that later conversion or trans-coding of the content can be accomplished as appropriate for the file type.

If a source content file a suitable type is not available, the gatherer module 330 and/or the decider module 335 can issue a request for the source content file. For example, the gatherer module 330 and/or the decider module 335 can issue a request to a human operator to provide the requested sub-asset. In some cases, further processing by the conversion workflow may pause or wait until the requested sub-assets are available. The processes of the gather module 330 and the decider module 335, i.e., identifying the available source content files and determining which source content files to use and how to combine those sub-assets to generate a requested deliverable, can be an iterative process. For example, the processes of identifying the available source content files, determining which source content files to use and how to combine those sub-assets to generate a requested deliverable, requesting suitable sub-asset files if they are not available, etc., can be repeated by the gather module 330 and decider module 335 until a complete set of sub-asset data files 326 and corresponding metadata 306 for generating the content deliverable is available.

Once the gather module 330 has identified and collected all of the sub-asset data files 326 and metadata 306 related thereto and the decider module 335 has determined how those constituent sub-asset data files 326 should be combined and/or converted to form the deliverable content file, the decider module 335 can pass the metadata 306 and sub-asset data files 326 to the presenter module 340. The presenter 340 can then combine the sub-asset data files 326 into an asset data file 350 representing the aggregated sub-assets. The presenter module 340 can also combine the metadata 306 related to the sub-asset data files 326 into an aggregated metadata file 345 related to the asset data 350. The presenter module 340 can then pass the aggregated metadata 345 and the asset data 350 to the broker 206 described above with reference to FIG. 2.

Figure 4:
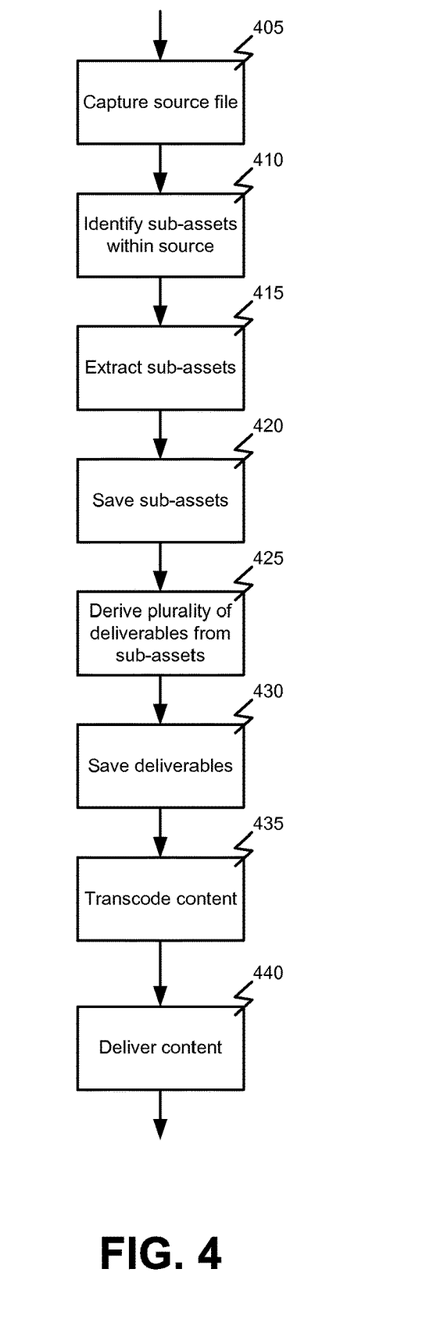
FIG. 4 is a flowchart illustrating a process for providing media for multi-channel distribution according to one embodiment of the present invention.

FIG. 4 is a flowchart illustrating a process for providing media for multi-channel distribution according to one embodiment of the present invention. More specifically, this example illustrates an abstraction of a process for converting multi-media content to multiple deliverable formats such as may be performed by the conversion workflow described above. In this example, the process begins with capturing 405 a single source content file. One or more sub-assets can be identified 410 within the single source content file. The one or more identified sub-assets can be extracted 415 from the single source content file and saved 420 as individual constituent parts of the single source content file.

As noted above, a plurality of deliverable content files in formats specific to different distribution channels can be derived 425 from the single source content file. Deriving 425 the plurality of deliverable content files from the single source content file can comprise deriving 425 the plurality of deliverable content files from the individual constituent parts of the single source content file. Deriving 425 the plurality of deliverable content files can be based at least in part on a set of business rules. Deriving 425 the plurality of deliverable content files can comprise adding one or more graphics to the deliverable content files based on the business rules, adding branding information to the deliverable content files based on the business rules, adding rating information to the deliverable content files based on the business rules, and/or adding content elements to the deliverable content files based on the business rules. For example, the content elements can include but are not limited to closed captioning information, an alternative language soundtrack, digital rights management information, etc.

As noted above, the deliverable content files can be saved 420 in a content repository. The plurality of deliverable content files, either those saved 430 in a content repository or those newly derived 425, can be trans-coded 435 from the source content file to the format specific the different distribution channels. The trans-coded 435 content files can then be distributed 440 via any of a variety of channels as described above.

According to one embodiment of the present invention, an audio level of multi-media content provided to the content distribution facility 102 can be normalized. For example, the conversion workflow 205 or other element of the content distribution facility 102 described above can be adapted to locate spoken dialog within the multi-media content stored in the source content file repository 125 based on closed captioning data related to the multi-media content. An actual sound level of an audio portion of the multi-media content can be determined based on the located spoken dialog. If the actual sound level of the spoken dialog does not match an indication of an audio level associated with the multi-media content, the actual sound level of the audio portion of the multi-media content and/or the indication of the audio level associated with the multi-media content can be adjusted.

Figure 5:
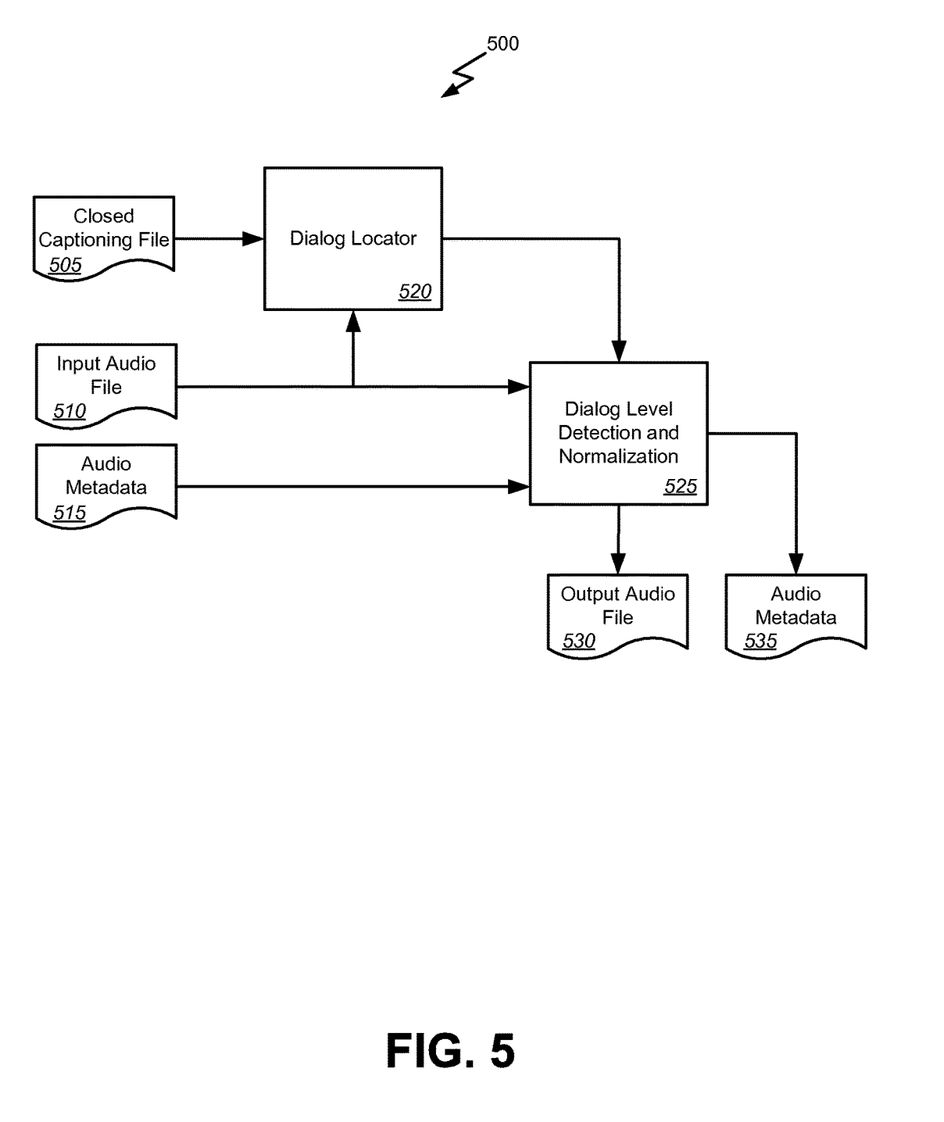
FIG. 5 is a block diagram illustrating a system for normalizing an audio level of multi-media content according to one embodiment of the present invention.

FIG. 5 is a block diagram illustrating a system for normalizing an audio level of multi-media content according to one embodiment of the present invention. In this example, the system 500 includes a dialog locator 520 and a dialog level detection and normalization module 525. The dialog locator 520 and a dialog level detection and normalization module 525 can be implemented, for example as part of or may be triggered by the conversion workflow 205 or other component of the content distribution facility 102 described above.

The dialog locator 520 can be adapted to read an input audio file 510 of the multi-media content and locate spoken dialog within the input audio file 510 based on closed captioning data 505 related to the multi-media content. For example, locating the spoken dialog within the multi-media content is further based on matching a timestamp on the closed captioning data 505 to a timestamp on the input audio file 510 of the multi-media content. The location of the spoken dialog, e.g., timestamp values, along with the input audio file 510 and audio metadata 515 associated with the input audio file 510 can be provided to the dialog level detection and normalization module 525

The dialog level detection and normalization module 525 can receive the dialog location information and input audio file 510 and determine an actual sound level of the input audio file 510 at the indicated locations. That is, the dialog level detection and normalization module 525 can be adapted to detect an actual audio level of the input audio file 510 at locations including spoken dialog as indicated by the dialog locator module 520. The dialog level detection and normalization module 525 can determine whether an indication of an audio level associated with the input audio file 510 matches the actual sound level of the a input audio file 510. For example, the indication of the audio level associated with the input audio file 510 can comprise metadata 515 within or associated with the input audio file 510. In response to determining that the indication of the audio level associated with the input audio file 510 does not match the actual sound level of the audio portion of the multi-media content, the dialog level detection and normalization module 525 can be adapted to adjust the actual sound level of the input audio file 510 and/or the indication of the audio level associated with the input audio file 510, e.g., the audio metadata 515. In some cases, in response to determining that the indication of the audio level associated with the input audio file 510 does not match the actual sound level of the input audio file 510, the dialog level detection and normalization module 525 can be adapted to determine whether to adjust the actual sound level of the input audio file 510 or the indication of the audio level, e.g., the metadata. Such a determination can be based on, for example, the set of business rules 245 of the conversion workflow 205 described above.

Figure 6:
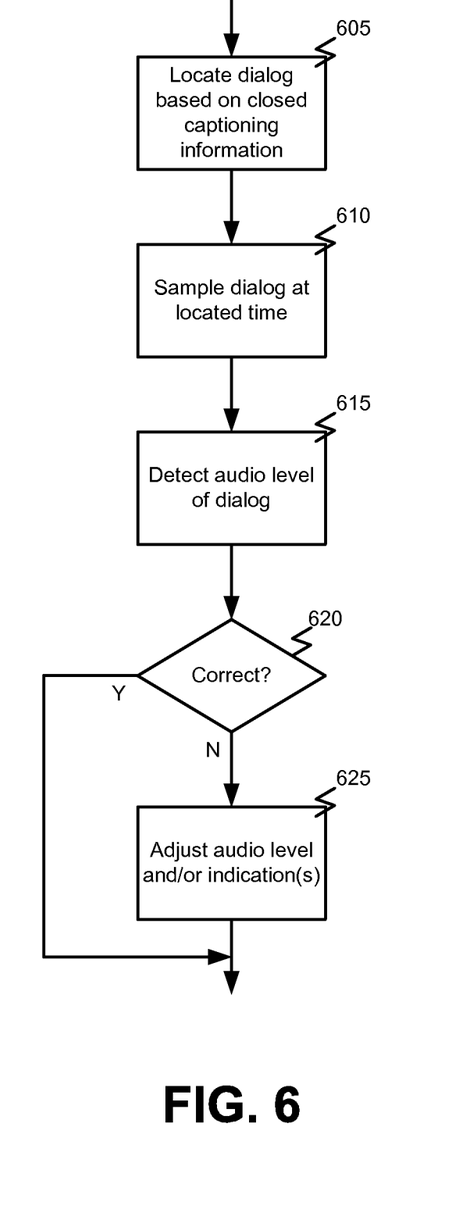
FIG. 6 is a flowchart illustrating a process for normalizing an audio level of multi-media content according to one embodiment of the present invention.

FIG. 6 is a flowchart illustrating a process for normalizing an audio level of multi-media content according to one embodiment of the present invention. In this example, the process begins with locating 605 spoken dialog within the multi-media content. Locating 605 spoken dialog within the multi-media content can be based on closed captioning data related to the multi-media content. For example, locating the spoken dialog within the multi-media content can be based on matching a timestamp on the closed captioning data to a timestamp on the multi-media content. According to one embodiment, locating 605 spoken dialog within the content can comprise locating all or substantially all of the spoken dialog. Alternatively, periodic samples can be located. However, to prevent individual samples that may be very loud or very quiet from skewing the results, a large number of samples may be located.

Once the spoken dialog has been located 605, a number of samples or measures of the audio portion can be taken 610 of the located dialog. As noted above, the samples or measures can include all or substantially all of the dialog. Alternatively, less than all of the dialog may be sampled or measured. However, a larger number of samples can be helpful to prevent very loud or very quiet from skewing the results.

An actual sound level of the audio portion of the multi-media content can be detected 615 based on the located spoken dialog. It should be noted that, while locating 605 spoken dialog within the multi-media content and detecting 615 an actual sound level of an audio portion of the multi-media content can be based on a single sample, in other implementations, locating 605 spoken dialog within the multi-media content and detecting 615 an actual sound level of an audio portion of the multi-media content can be based on an average of any number of samples.

Once an actual sound level of an audio portion of the multi-media content has been determined, a determination can be made as to whether an indication of an audio level associated with the multi-media content matches the actual sound level of the audio portion of the multi-media content. The indication of the audio level associated with the multi-media content can comprise, for example, metadata within the multi-media content. In response to determining that the indication of the audio level associated with the multi-media content does not match the actual sound level of the audio portion of the multi-media content, the actual sound level of the audio portion of the multi-media content and/or the indications of the audio level associated with the multi-media content can be adjusted 625, for example, to match or more closely match.

That is, in response to determining that the indication of the audio level associated with the multi-media content does not match the actual sound level of the audio portion of the multi-media content, the actual sound level of the audio portion of the multi-media content can be adjusted to more closely match the indication. Alternatively or additionally, the indication of the audio level associated with the multi-media can be adjusted to more closely match the actual sound level. According to one embodiment, in response to determining that the indication of the audio level associated with the multi-media content does not match the actual sound level of the audio portion of the multi-media content, another determination can be made as to whether to adjust the actual sound level of the audio portion of the multi-media content or the indication of the audio level associated with the multi-media. Determining whether to adjust the actual sound level of the audio portion of the multi-media content or the indication of the audio level associated with the multi-media can be based at least in part on a set of business rules. Such rules can define, for example, whether the actual sound level can be adjusted, how much it can be adjusted, etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of converting multi-media content to multiple deliverable formats using a conversion workflow, the method comprising:
   capturing, using one or more processors, a single source content file comprising a complete video object with associated video metadata;
   storing, using the one or more processors, a plurality of audio tracks with associated audio metadata, wherein the plurality of audio tracks are compatible with the complete video object;
   storing, using the one or more processors, a plurality of graphic objects with associated graphic metadata;
   receiving, using the one or more processors, a selection of a plurality of different video distribution channels;
   deriving, using the one or more processors, a deliverable content file for each of the plurality of different video distribution channels by:
      selecting a video transcoder from among a plurality of video transcoders, wherein the video transcoder is specific to the video distribution channel;
      selecting an audio track from the plurality of audio tracks, wherein the audio track is specific to the video distribution channel;
      selecting a graphic object from the plurality of graphic objects;
      transcoding the complete video object into a deliverable content file having a format specific to the video distribution channel;
      adding the graphic object to the deliverable content file;
      combining the audio track with the deliverable content file; and
      aggregating at least the video metadata, the audio metadata, and the graphic metadata to generate a single aggregated metadata file for the deliverable content file; and
   delivering, using the one or more processors, a plurality of deliverable content files and the plurality of single aggregated metadata files to the corresponding different video distribution channels.

2. The method of claim 1, wherein capturing the single source content file further comprises further comprising:
   identifying one or more sub-assets within the single source content file based on the conversion workflow;
   extracting the one or more sub-assets; and
   saving the one or more sub-assets as individual constituent parts of the single source content file.

3. The method of claim 2, wherein deriving each deliverable content file further comprises deriving the plurality of deliverable content files from the individual constituent parts of the single source content file.

4. The method of claim 1, wherein deriving each deliverable content file is based at least in part on a set of business rules defined by the conversion workflow.

5. The method of claim 4, wherein deriving each deliverable content file further comprises adding branding information to the deliverable content files based on the business rules.

6. The method of claim 4, wherein deriving each deliverable content file further adding rating information to the deliverable content files based on the business rules.

7. The method of claim 4, wherein deriving each deliverable content file further comprises adding content elements to the deliverable content files based on the business rules.

8. The method of claim 7, wherein the content elements include closed captioning information.

9. The method of claim 7, wherein the content elements include an alternative language soundtrack.

10. The method of claim 7, wherein the content elements include digital rights management information.

11. The method of claim 1, further comprising saving the deliverable content files in a content repository.

12. A non-transitory machine-readable medium comprising instructions that, when executed by a processor, cause the processor to convert multi-media content to multiple deliverable formats by:
    capturing a single source content file comprising a complete video object with associated video metadata;
    storing a plurality of audio tracks with associated audio metadata, wherein the plurality of audio tracks are compatible with the complete video object;
    storing a plurality of graphic objects with associated graphic metadata;
    receiving a selection of a plurality of different video distribution channels;
    deriving a deliverable content file for each of the plurality of different video distribution channels by:
        selecting a video transcoder from among a plurality of video transcoders, wherein the video transcoder is specific to the video distribution channel;
        selecting an audio track from the plurality of audio tracks, wherein the audio track is specific to the video distribution channel;
        selecting a graphic object from the plurality of graphic objects;
        transcoding the complete video object into a deliverable content file having a format specific to the video distribution channel;
        adding the graphic object to the deliverable content file;
        combining the audio track with the deliverable content file; and
        aggregating at least the video metadata, the audio metadata, and the graphic metadata to generate a single aggregated metadata file for the deliverable content file; and
    delivering a plurality of deliverable content files and the plurality of single aggregated metadata files to the corresponding different video distribution channels.

13. The non-transitory machine-readable medium of claim 12, wherein capturing the single source content file further comprises:
    identifying one or more sub-assets within the single source content file based on a conversion workflow;
    extracting the one or more sub-assets; and
    saving the one or more sub-assets as individual constituent parts of the single source content file.

14. The non-transitory machine-readable medium of claim 13, wherein deriving each deliverable content file further comprises deriving the plurality of deliverable content files from the individual constituent parts of the single source content file.

15. A system comprising:
    one or more processors; and
    one or more memory devices comprising a source content file repository and instructions that, when executed by the one or more processors, cause the one or more processors to execute a common conversion workflow by performing operations comprising:
        capturing a single source content file comprising a complete video object with associated video metadata;
        storing a plurality of audio tracks with associated audio metadata, wherein the plurality of audio tracks are compatible with the complete video object;
        storing a plurality of graphic objects with associated graphic metadata;
        receiving a selection of a plurality of different video distribution channels;
        deriving a deliverable content file for each of the plurality of different video distribution channels by:
            selecting a video transcoder from among a plurality of video transcoders, wherein the video transcoder is specific to the video distribution channel;
            selecting an audio track from the plurality of audio tracks, wherein the audio track is specific to the video distribution channel;
            selecting a graphic object from the plurality of graphic objects;
            transcoding the complete video object into a deliverable content file having a format specific to the video distribution channel;
            adding the graphic object to the deliverable content file;
            combining the audio track with the deliverable content file; and
            aggregating at least the video metadata, the audio metadata, and the graphic metadata to generate a single aggregated metadata file for the deliverable content file; and
        delivering a plurality of deliverable content files and the plurality of single aggregated metadata files to the corresponding different video distribution channels.

16. The system of claim 15 wherein the one or more memory devices comprise additional instructions that cause the one or more processors to perform additional operations comprising:
    capturing the single source content file by identifying one or more sub-assets within the single source content file;
    extracting the one or more sub-assets; and
    saving the one or more sub-assets in the source content file repository as individual constituent parts of the single source content file.

17. The system of claim 15 wherein deriving each deliverable content file is based at least in part on a set of business rules defined by the conversion workflow.

18. The system of claim 17 wherein deriving each deliverable content file further comprises adding branding information to the deliverable content files based on the business rules.

19. The system of claim 17, wherein deriving each deliverable content file further adding rating information to the deliverable content files based on the business rules.

20. The system of claim 17, wherein deriving each deliverable content file further comprises adding content elements to the deliverable content files based on the business rules, wherein the content elements comprise one or more of the following:
   closed captioning information;
   an alternative language soundtrack; and
   digital rights management information.

\* \* \* \* \*